United States Patent [19]

Richardson et al.

[11] Patent Number: 5,926,784
[45] Date of Patent: Jul. 20, 1999

[54] METHOD AND SYSTEM FOR NATURAL LANGUAGE PARSING USING PODDING

[75] Inventors: Steve Richardson, Redmond; Karen Jensen, Bellevue, both of Wash.

[73] Assignee: Microsoft Corporation, Redmond, Wash.

[21] Appl. No.: 08/896,553

[22] Filed: Jul. 17, 1997

[51] Int. Cl.$^6$ .............................. G06F 17/27; G06F 17/21
[52] U.S. Cl. .................................. 704/9; 704/10
[58] Field of Search ..................... 704/9, 10, 1; 707/531, 707/532, 104, 1, 2, 3, 4, 5, 6

[56] References Cited

U.S. PATENT DOCUMENTS

| | | | |
|---|---|---|---|
| 5,060,155 | 10/1991 | Van Zuijlen | 704/9 |
| 5,146,406 | 9/1992 | Jensen | 704/9 |
| 5,418,717 | 5/1995 | Su et al. | 704/9 |
| 5,487,000 | 1/1996 | Takahashi et al. | 704/9 |
| 5,528,491 | 6/1996 | Kuno et al. | 704/9 |
| 5,537,317 | 7/1996 | Schabes et al. | 704/9 |
| 5,687,384 | 11/1997 | Nagese | 704/9 |
| 5,694,559 | 12/1997 | Hobson et al. | 345/336 |
| 5,748,975 | 5/1998 | Van De Vanter | 707/531 |
| 5,752,052 | 5/1998 | Richardson et al. | 704/9 |
| 5,799,269 | 8/1998 | Schabes et al. | 704/9 |

FOREIGN PATENT DOCUMENTS

36-2186360  8/1987  Japan .
40-7141367  6/1995  Japan .

*Primary Examiner*—Joseph Thomas
*Attorney, Agent, or Firm*—Seed and Berry LLP

[57] ABSTRACT

A method and system for determining the likelihood that a certain syntax rule when applied to a partial parse of an input will produce a node that will be part of the correct parse for the input. Each syntax rule indicates a higher-level syntactic construct that can be formed from one or more lower-level syntactic constructs. Each syntax rule has a probability which indicates the likelihood that the syntax rule will succeed and produce a node in the resulting parse tree. Each syntax rule also has a heuristic score formula indicating how to calculate a heuristically derived score for the higher-level syntactic construct created when the syntax rule is successfully applied. When a syntax rule is successfully applied while parsing the input sentence, the system calculates a probability for the higher-level syntactic construct produced by the syntax rule. The system then calculates a heuristic score for the higher-level syntactic construct produced by the syntax rule based on the heuristic score formula of the syntax rule and the calculated heuristic scores of the lower-level syntactic constructs to which the syntax rule was successfully applied. The system then combines the calculated probabilities and the calculated heuristic scores to guide the selecting of syntax rules to apply.

46 Claims, 7 Drawing Sheets

Fig. 6

METHOD AND SYSTEM FOR NATURAL LANGUAGE PARSING USING PODDING

TECHNICAL FIELD

The present invention relates to the field of natural language processing ("NLP"), and more particularly, to a method and system for generating syntax parse trees.

BACKGROUND OF THE INVENTION

A natural language parser is a program that takes a segment, usually a sentence, of natural language (i.e., human language, such as English) text as input and produces as output for that segment a data structure, usually referred to as a parse tree. This parse tree typically represents the syntactic relationships between the words in the input segment. Natural language parsers have traditionally been "rule-based." Such rule-based parsers store knowledge about the syntactic structure of a language in the form of syntax rules, and apply these rules to the input text segment to obtain the resulting parse tree. The parser usually stores information about individual words, such as what part-of-speech they can represent, in a dictionary or "lexicon," which is accessed by the parser for each word in the input text prior to applying the syntax rules.

Parsers apply rules in either a "top-down" or a "bottom-up" manner. In the following example, bottom-up parsing is described. To generate a parse tree, a bottom-up parser first creates one or more leaf nodes for each word of an input sentence. Each leaf node indicates a possible part-of-speech of the word. For example, the word "part" can be used as a noun or a verb part-of-speech. The parser then applies the syntax rules to generate intermediate-level nodes linked to one, two, or occasionally more existing nodes. Assuming that the parse is successful, eventually the parser will generate a single root node for a complete syntax parse tree that encompasses an entire sentence (i.e., include one leaf node for each word of the input sentence).

A bottom-up parser attempts to apply syntax rules one-at-a-time to single leaf nodes, to pairs of leaf nodes, and, occasionally, to larger groups of leaf nodes. If the syntax rule specifies that two certain types of nodes can be combined into a higher-level node and a pair of adjacent nodes match that specification, then the parser applies the rule to the adjacent nodes to create a higher-level node representing the syntactic construct of the rule. Each rule comprises specification and optional conditions. The specification indicates that certain types of syntactic constructs can be combined to form a new syntactic construct (e.g., "verb phrase=noun+verb"), and the conditions, if any, specify criteria that need to be satisfied before the rule can succeed (e.g., plural agreement of noun and verb). For example, the words "he see" represent a noun and a verb, respectively, which can be potentially combined into the higher-level syntactic construct of a verb phrase. The specification of "verb phrase= noun+verb" indicates that an intermediate-level verb phrase node linked to the two leaf nodes representing "he" and "see" can be created. However, the syntax rule may have a condition which indicates that the noun and verb need to be in agreement as to number (singular or plural). In this example, since "he" is not in plural agreement with "see," the syntax rule does not succeed. Syntax rules whose specifications match nodes of sub-trees are rules that can be potentially (assuming the conditions are satisfied) applied to create a higher-level node. As each new node is created, it is linked to already-existing leaf nodes and intermediate-level nodes, and becomes part of the total set of nodes to which the syntax rules are applied. The process of applying syntax rules to the growing set of nodes continues until a complete syntax parse tree is generated. A complete syntax parse tree includes all of the words of the input as leaf nodes and represents one possible parse of the input.

A typical parser uses a chart data structure to track the nodes that have been created. Each node is represented by a record that is stored in the chart. A parser would typically select each syntax rule and determine whether it can be applied to the records currently in the chart. If the rule can be applied, then the parser checks the conditions on each of the constituents of the syntax rule. If the conditions are satisfied, then the rule succeeds and the parser creates a new record and stores it in the chart. Each record, thus, corresponds to a sub-tree that may potentially be part of the complete syntax parse tree. When a record is added to the chart that encompasses all the words of the input sentence, then the tree represented by the record is a complete parse of the input sentence.

The parser can conduct an exhaustive search for all possible complete syntax parse trees by continuously applying the rules until no additional rules can be applied. The parser can also use various heuristic or statistical approaches to guide the application of syntax rules so that the rules that are most likely to result in a complete syntax parse tree are applied first. Using such approaches, after one or a few complete syntax parse trees are generated, the parser typically can terminate the search because the syntax parse tree most likely to be chosen as best representing the input is probably one of the first generated syntax parse trees. If no complete syntax parse trees are generated after a reasonable search, then a fitted parse can be achieved by combining the most promising sub-trees together into a single tree using a root node that is generated by the application of a special aggregation rule.

In one parser, the syntax rules are ordered by their probabilities of successful application. The probabilities used are based on syntactic analysis of a number of standard input sentences. The statistical ordering of syntax rules is described in U.S. patent application Ser. No. 08/265,845, entitled "Bootstrapping Statistical Processing," which is hereby incorporated by reference. The parser attempts to apply syntax rules in the order of their probabilities. In general, application of a great many less probable rules is avoided, saving the time of their application.

Although such parsers can theoretically generate all possible syntax parse trees for an input sentence, they have the serious drawback that, despite statistical rule ordering, the complexity of the generated intermediate parse trees grows exponentially with the length of the input sentence being parsed. This exponential growth can quickly exceed memory and response time constraints for a particular application program that uses the parser. When memory or response time constraints have been exceeded, and parsing is stopped, the parser may have failed to produce a parse tree that spans all of the words in the input sentence. In particular, the parser may have failed to parse certain portions of the input. Thus, the resulting parse tree is completely uninformative as to those portions that were not parsed.

SUMMARY OF THE INVENTION

The present invention provides a method and system for determining the likelihood that a certain syntax rule when applied to a partial parse of an input will produce a node that will be part of the correct parse for the input. Each syntax rule indicates a higher-level syntactic construct that can be formed by one or more lower-level syntactic constructs. Each syntax rule has a probability which indicates the likelihood that the syntax rule will succeed and produce a node in the resulting parse tree. Each syntax rule also has a heuristic score formula indicating how to calculate a heuristically derived score for the higher-level syntactic construct produced when the syntax rule is successfully applied. When a syntax rule is successfully applied when parsing the input, the system calculates a probability for the higher-level syntactic construct produced by the syntax rule. The system then calculates a heuristic score for the higher-level syntactic construct produced by the syntax rule based on the heuristic score formula of the syntax rule and the calculated heuristic scores of the lower-level syntactic constructs to which the syntax rule was successfully applied. The system then combines the calculated probabilities and the calculated heuristic scores to guide the selecting of syntax rules to apply.

DETAILED DESCRIPTION OF THE INVENTION

The present invention provides a method and system for performing natural language syntactic analysis by generating a syntax parse tree that represents the results of syntactic analysis of input. The Probability of Discreteness ("Podding") system of the present invention applies heuristic scoring techniques to determine the likelihood that the application of a syntax rule will generate a node that is part of the correct parse of the input. Each syntax rule has heuristic score formulas that indicate the calculations to use to determine the heuristic score when the rule is successfully applied. A heuristic score formula for a syntax rule may indicate that various calculations are conditional. The calculations generally combine the heuristic scores of the syntactic constructs to which a syntax rule is applied and then modify the combined heuristic score based on the conditional calculations. For example, a syntax rule, which indicates that an adjective and a noun can be combined to form a higher-level noun phrase construct, may have a heuristic score formula that indicates the combined heuristic score for the noun phrase construct is the sum of the heuristic scores of the adjective and noun constructs. Another formula may also indicate to add an additional amount to the combined heuristic score if the adjective is a determiner. The Podding system uses these heuristic scores to guide the parsing so that the time and space needed to determine the correct syntax parse tree is reduced. To further improve the efficiency of parsing, the Podding system combines heuristic scores with probabilities assigned to the syntax rules to further guide the parsing. U.S. patent application Ser. No. 08/265,845, entitled "Bootstrapping Statistical Processing," describes a technique for generating the probabilities. Thus, a syntactic construct that has the highest heuristic score may not be selected to guide the parsing when its probability is very low. To combine the heuristic scores and probabilities in a meaningful way, the Podding system normalizes the heuristic scores to a range of values that correspond to the range of possible values for the probabilities and then combines the normalized heuristic score with the probability. In this way, the Podding system can use both heuristic information and probabilities to guide the parsing to achieve better overall performance.

Figure 1:
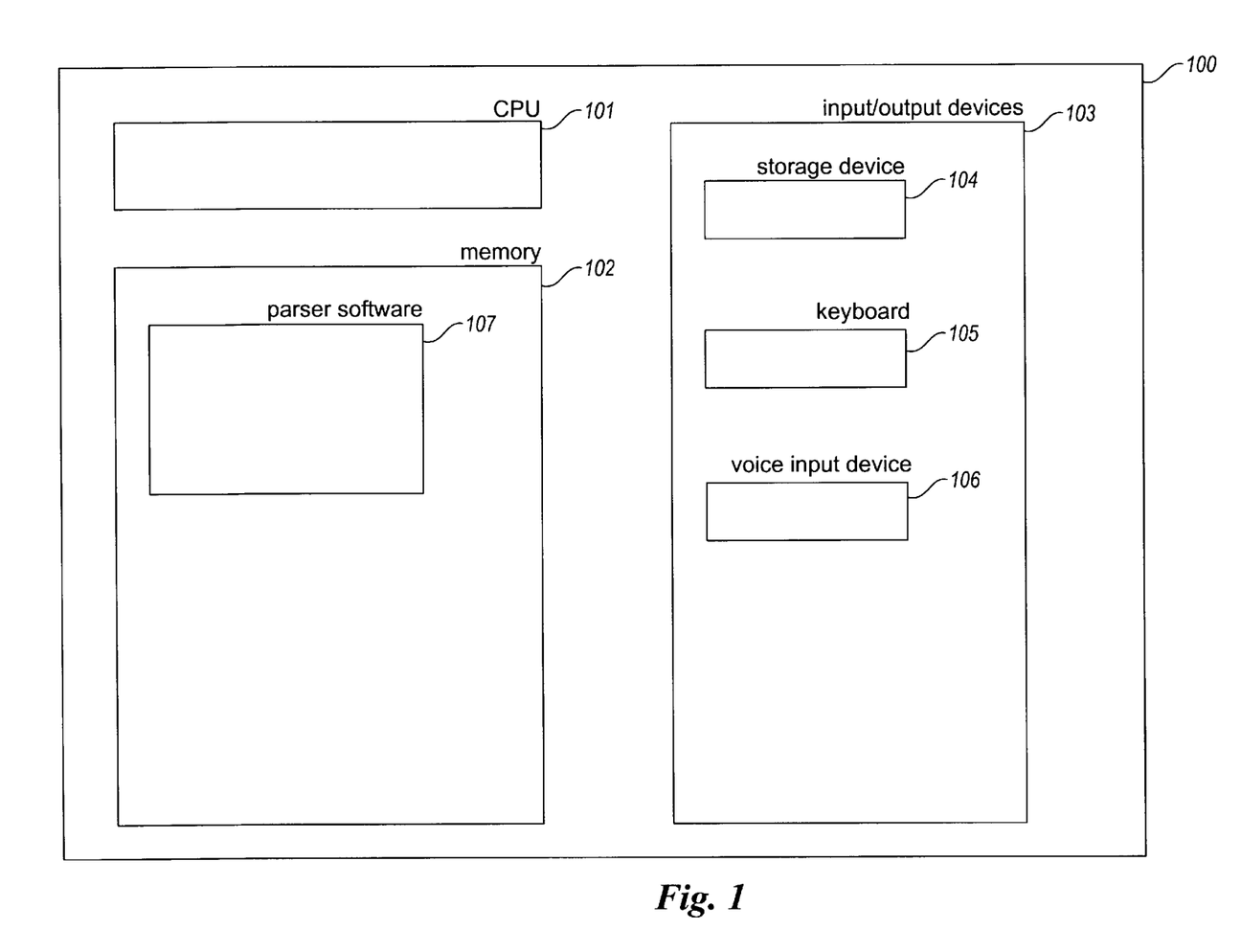
FIG. 1 is a high-level block diagram of the general-purpose computer system upon which the parser preferably operates.

FIG. 1 is a high-level block diagram of the general-purpose computer system upon which the parser preferably operates. The computer system 100 contains a central processing unit (CPU) 101, a computer memory (memory) 102, and input/output devices 103. The input/output devices include a storage device 104, such as a hard disk drive, a keyboard 105, and optionally a voice input device 106. The parser software 107 preferably resides in the memory 102 and executes on the CPU 101. The parser may be initially loaded into memory from a computer-readable medium such as a CD-ROM. Input strings to be parsed by the parser may be retrieved from the storage device 104. Typed input strings may be received for parsing from keyboard 105, and spoken input strings received and interpreted by the voice input device 106. While the parser is preferably implemented on a computer system configured as described above, it may also be implemented on computer systems having different configurations.

Figure 2A:
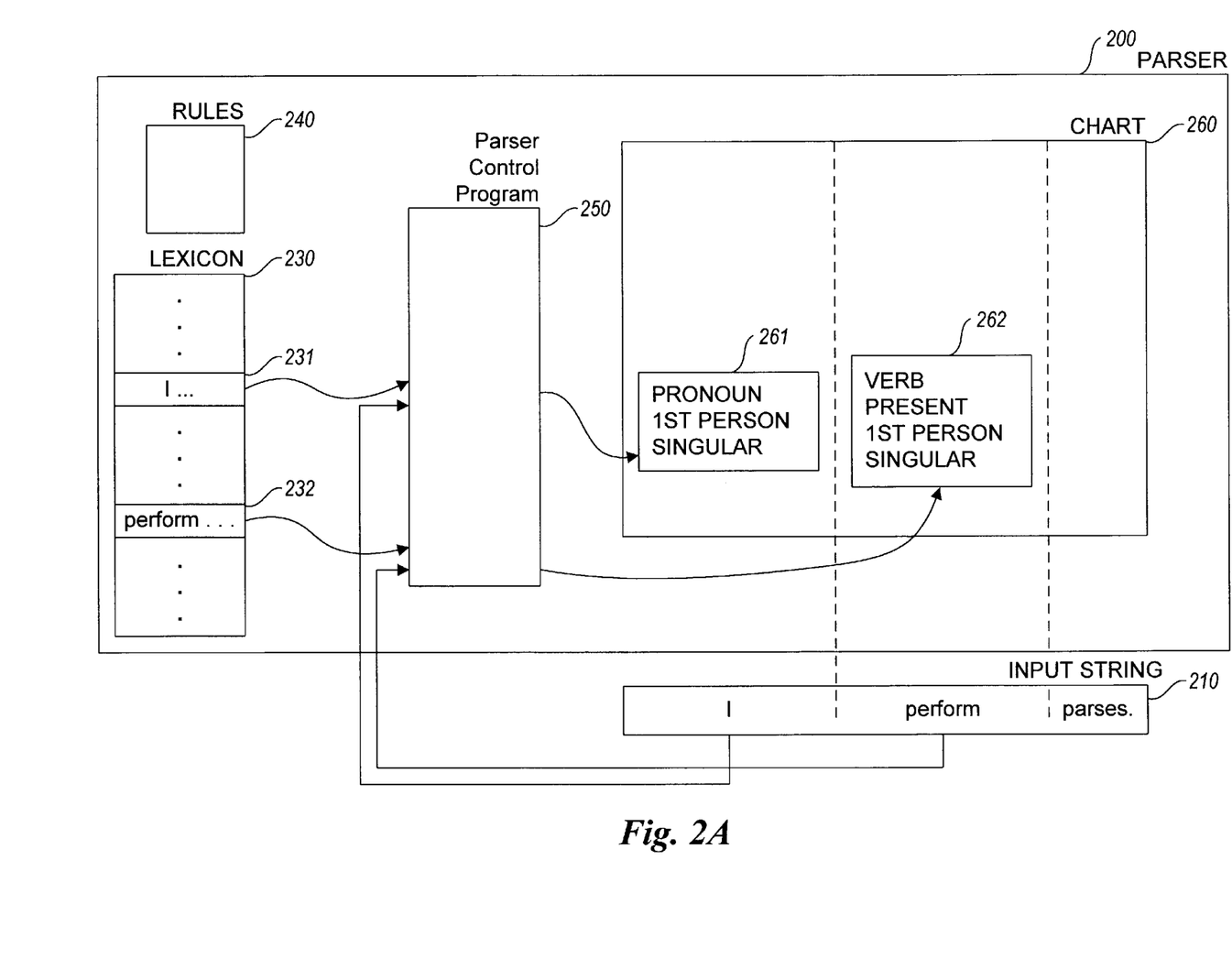
FIGS. 2A–2B are block diagrams that illustrate the operation of an embodiment of the Podding system.
Figure 2B:
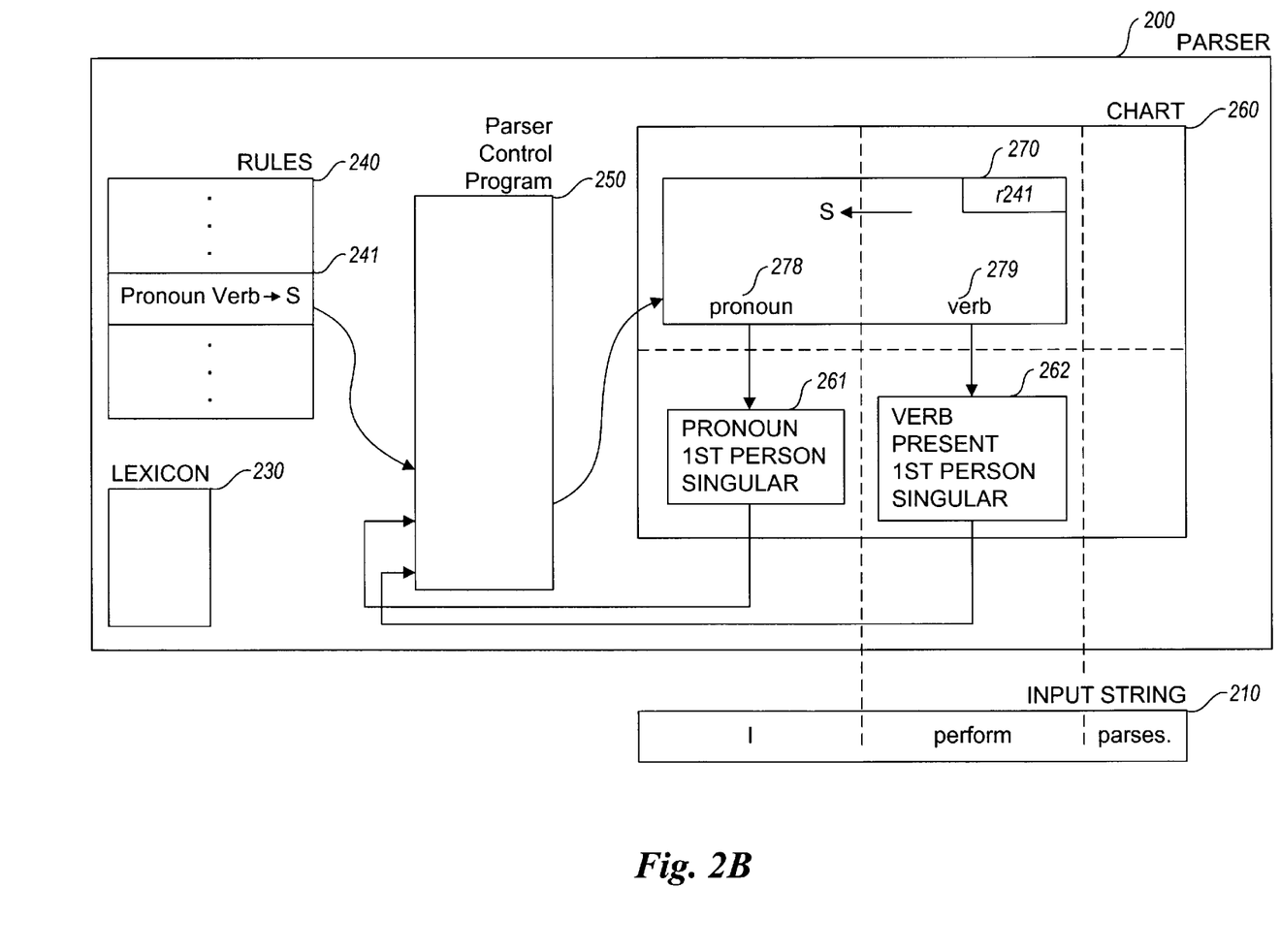

FIGS. 2A–2B are block diagrams that illustrate the operation of an embodiment of the Podding system. FIG. 2A shows the organization of the parser and illustrates the application of entries in the lexicon. The parser 200 operates to parse an input string 210 (e.g., "I perform parses"). The parser is comprised of a lexicon 230 that contains one or more entries for each word known to the parser. Each lexicon entry specifies a part of speech for one word, as well as other associated information, such as person, number, and tense. As an example, the lexicon 230 contains lexicon entry 231 that specifies the word "I" has the part of speech "pronoun," the person "first person," and the number "singular." These values are usually encoded to reduce the size of the lexicon. The parser 200 also contains a set of augmented phrase structure grammar rules ("syntax rules") 240. The parser 200 further contains a parser control program 250. The parser control program applies lexicon entries and rules to produce new records in a working area for assembling a parse tree for the input string called a chart 260, in order to eventually produce one or more sentence records (i.e., that encompass a leaf record for each word) in the chart.

At the beginning of a parse of input string 210, the chart 260 contains no records. The parser control program 250 begins by selecting one or more lexicon entries corresponding to words in the input string 210 to apply and by creating a record corresponding to each lexicon entry in the chart 260. (For words having more than one possible part of speech, the lexicon contains multiple entries. The parser control program may select one or more of these multiple lexicon entries for addition to the chart.) For instance, the parser control program selects lexicon entry 231, which corresponds to the word "I" in the input string 210, and creates record 261 in the chart when such a word appears in the input string 260. The record 261 contains information copied from the lexicon entry, e.g., the part of speech "pronoun," the person "first person," and the number "singular." In the same way, the rule lexicon application program 250 creates record 262 in the chart 260 by copying information from a lexicon entry 232 corresponding to the word "perform" in the input string 210. The process of creating a record in the chart from a lexicon entry for a word is also known as generating a lexical characterization of the word.

FIG. 2B demonstrates the application of the rules. For this example, a small set of simplified rules are described in order to facilitate the discussion. The rules 240 each specify the creation of a new record in the chart 260 to represent the combination of one or more records. The rules 240 are designed such that, by repeated application of various rules, a record is eventually created that represents the entire input string. Because the input string preferably corresponds to one sentence (but may correspond to any similar segment of text), the ultimate record is a record that represents an entire sentence, or a "sentence record." Each rule contains four parts: the type and order of records combined by the rule, the type of result record produced by the rule to represent the combination of the combined records, conditions that regulate when a rule may create a result record, and structure-building actions that add information to the newly created record. If the conditions are satisfied, the parser control program 250 creates a result record of the type specified by the rule in the chart 260 and performs the structure-building action specified by the rule. The process of creating a record in the chart from a rule is also known as generating a syntactic characterization of a group of words in the input string.

For instance, rule 241 specifies combining a pronoun followed by a verb into a Sentence. Rule 241 specifies that, in order for a result record to be created, the pronoun and verb must agree in person and number. Such a rule may be written as follows:

| rule # | combined record types | conditions | created record type |
|---|---|---|---|
| 241 | pronoun verb | person, number agreement | sentence |

In order to combine records 261 and 262, representing a pronoun and a verb respectively, the parser control program 250 attempts to apply rule 241, since it combines a pronoun followed by a verb. The parser control program 250 evaluates the conditions of rule 241: as record 261 is first person and record 262 is first person, the records to be combined agree in person; as record 261 is singular and record 262 is singular, the records to be combined agree in number. Thus, the conditions of rule 261 are satisfied. The parser control program 250 therefore creates result record 270 in the chart to represent the combination of records 261 and 262 into a sentence, as shown by the transformation shorthand "pronoun verb→S." One function of the structure-building actions is to insert into created record pointers to each combined record so that, when a sentence record is ultimately created that represents the entire input string (Result record 270 only represents the substring "I perform."), it is at the head of a parse tree that represents the sentence at each level of syntactic detail. For example, the result record 270 contains a pronoun pointer 278 to record 261 and a verb pointer 279 to record 262. In the parse tree, each leaf node corresponds to a record created from a lexicon entry, and each non-leaf node to a record created from a rule.

The Podding system calculates a heuristic score, referred to as the Probability of Discreteness ("POD") score, for each syntactic construct identified when parsing the input. Each identified syntactic construct is represented by a non-leaf node, which in turn is represented by a record created from a rule. The POD score reflects the likelihood that the syntactic structure represented by the node, and the sub-tree for which it is the root node, corresponds to a syntactic construct that would be identified as correct by a human reader of the input. The higher the POD score, the more likely that the sub-tree will end up as part of a complete syntax parse tree.

Figure 3:
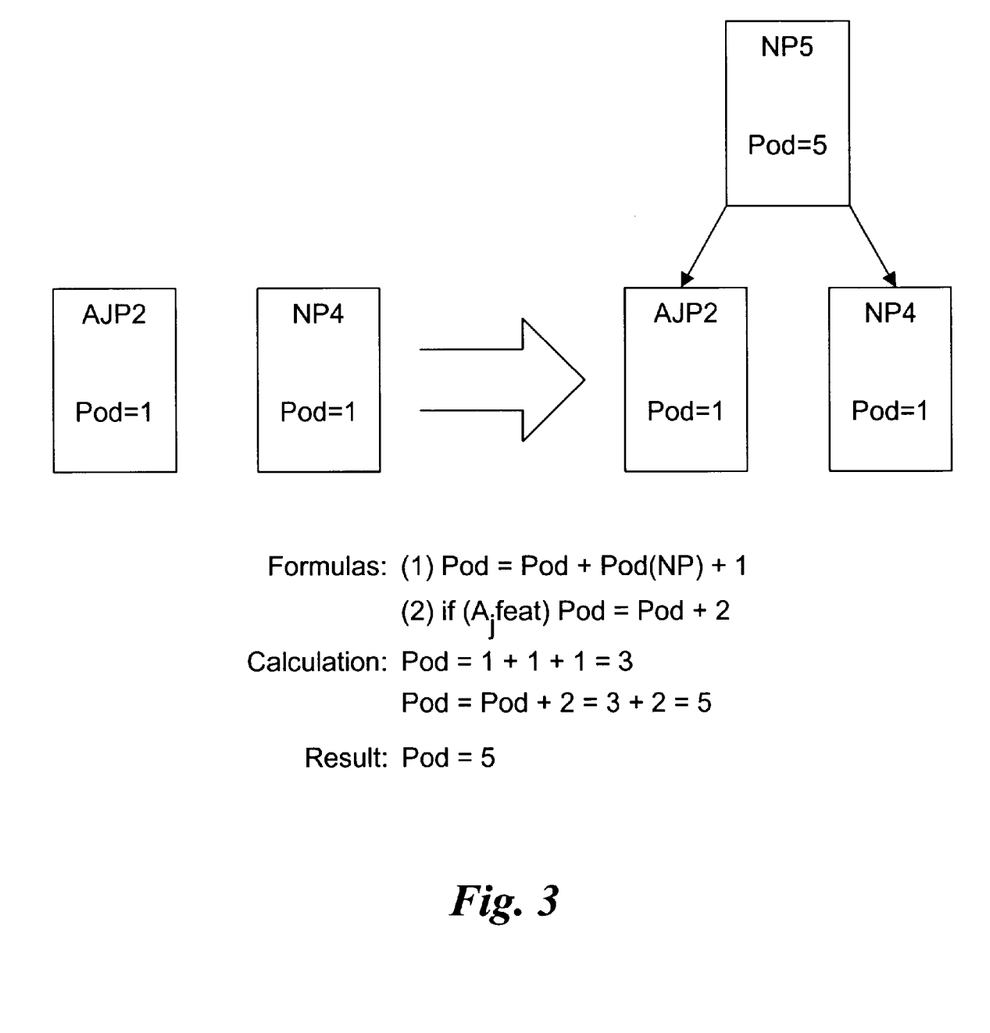
FIG. 3 shows the application of a syntax rule that indicates an adjective phrase and a noun phrase can be combined to form a higher-level noun phrase and shows how the heuristic POD score is computed in this case.

FIG. 3 shows the application of a syntax rule that indicates an adjective phrase and a noun phrase can be combined to form a higher-level noun phrase. The syntax rule includes a list of POD score formulas that indicate the calculations to use to determine the POD score for the newly created node. The first POD score formula shown specifies that the POD scores of the nodes to which the syntax rule is being applied are added together and then incremented by one in order to compute an initial POD score for the new node. The second POD score formula shown specifies that if the node created by application of the syntax rule has a determiner as one of its child nodes, then the POD score should be increased by 2. Application of these two POD score formulas produces a POD score for the newly created node "NP5" of 5. Any POD score formulas that are applicable are used to compute the final POD score for the newly created node.

Figure 4:
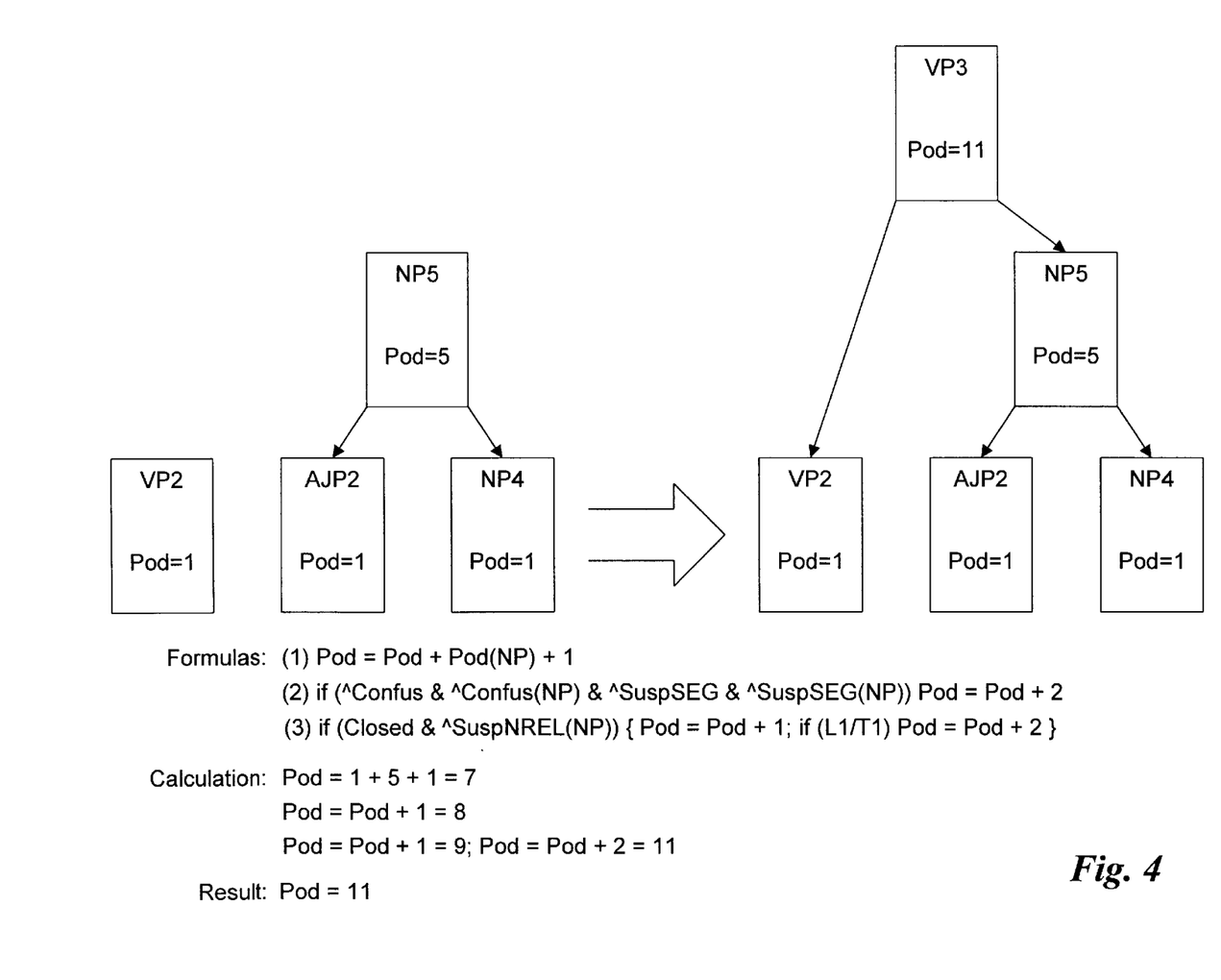
FIG. 4 shows the application of the syntax rule that indicates a verb phrase and a noun phrase can be combined to form a higher-level verb phrase and shows how the heuristic POD score is computed in this case.

FIG. 4 shows the application of the syntax rule that indicates a verb phrase and a noun phrase can be combined to form a higher-level verb phrase. The syntax rule includes a list of POD score formulas that indicate how to determine the POD score for the newly created node. The first POD score formula specifies that the POD scores of the nodes to which the syntax rule is being applied are added together and then incremented by one in order to compute an initial POD score for the new node. The second POD score formula specifies that if the nodes to which the syntax rule are applied do not refer to a word from a pair of words that are easily confused, such as the pair "form/from," and if the syntax constructs represented by the nodes are not labeled as syntactically ambiguous, then the POD score of the new node should be increased by one. The third POD score formula has two parts. The first part of the third POD score formula specifies that if the newly created verb phrase is unambiguously a verb phrase and if the newly created verb phrase could not be a nominal relative, then the POD score of the new node should be increased by one. The second part of the third POD score formula indicates that if the verb phrase has either an L1 or a T1 characteristic, then the POD score of the new node should be increased by 2. All three POD score formulas and both parts of the third formula apply in the syntax rule application illustrated with a resulting final POD score of 11.

The Podding system combines the POD scores with rule probabilities to generate an overall indication of the likelihood that each node will be part of a complete syntax parse tree. The POD scores of the nodes increase as the height of the sub-trees increase, whereas the probabilities of the nodes decrease as the height of the sub-trees increase. To combine the POD scores and the probabilities in a meaningful way, the Podding system first normalizes the POD scores based on the number of words (i.e., leaf nodes) represented by the POD score. For example, if the POD score for a given node is 15 and the number of words represented is 5, then the normalized POD score is 3 (i.e., 15÷5). Such a normalized POD score is referred to as the length-normalized POD score ("LNPS").

Figure 5A:
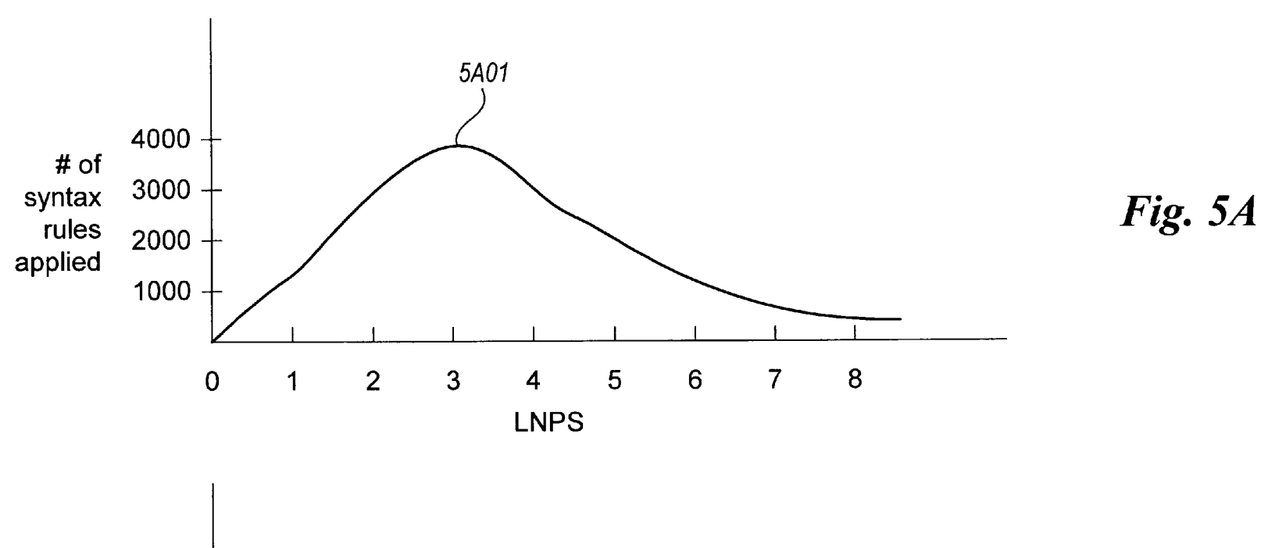
FIG. 5A illustrates a sample graph of the distribution of length normalized POD scores (LNPSs).
Figure 5B:
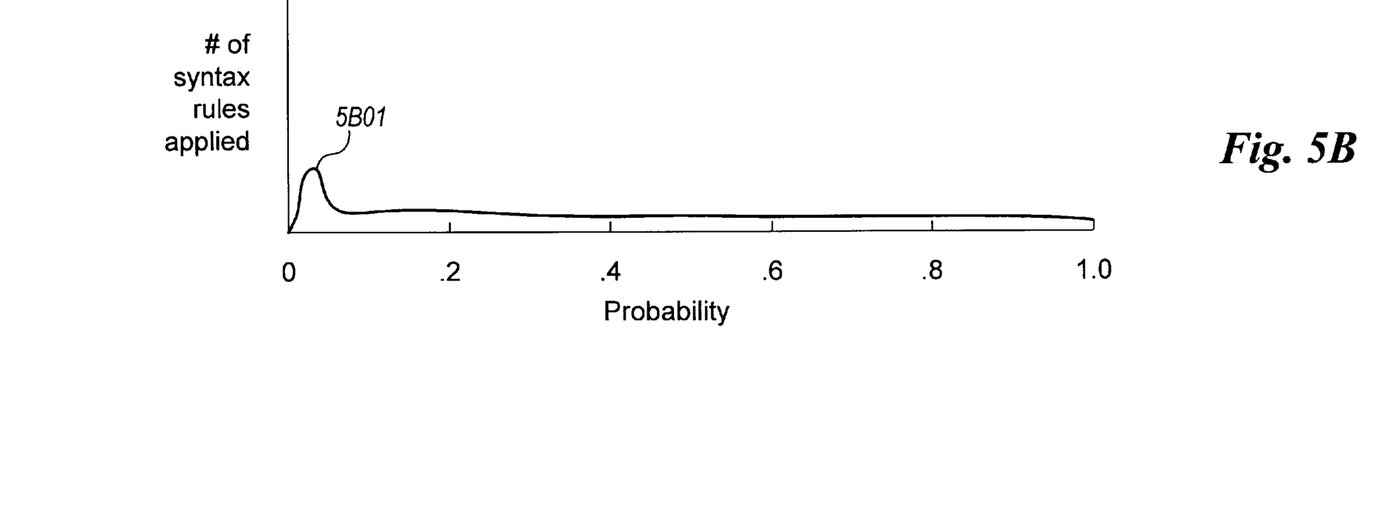
FIG. 5B illustrates a sample graph of the distribution of rule probabilities.

The Podding system then maps the range of possible LNPSs for nodes to the range of possible probabilities for the rules that generate nodes. Such ranges can be determined experimentally. For example, the LNPSs and the probabilities can be recorded for each syntax rule that is applied while parsing a large corpus. The LNPSs and the probabilities can then be graphed separately based on the number of times each LNPS or probability was recorded. FIG. 5A illustrates a sample graph of LNPSs. FIG. 5B illustrates a sample graph of probabilities. The horizontal axis of the graph of FIG. 5A represents the LNPS, and the horizontal axis of the graph of FIG. 5B represents the probabilities. The vertical axis of each graph is the number of syntax rules that were applied when parsing the large corpus. For example, the peak 5A01 of the graph of the LNPSs indicates that for about 4000 syntax rules which were applied, the resulting LNPS was about 3. Each graph has a different distribution throughout its range. The Podding system uses the proportion of the areas under the distribution curves to map LNPS values into the corresponding range of probability values. The following mapping function is used:

$$f(LNPS) = $$
$$A'_p\left(min\_p, A_{LNPS}(min\_LNPS, LNPS) * \frac{A_p(min\_p, max\_p)}{A_{LNPS}(min\_LNPS, max\_LNPS)}\right)$$

where max_p and min_p are the maximum and minimum probabilities in the range, where max_LNPS and min_LNPS are the maximum and minimum LNPSs in the range, where $A_p(x_1, x_2)$ is a function that returns the area under the probability curve between points $x_1$ and $x_2$, where $A_{LNPS}(x_1, x_2)$ is a function that returns the area under the LNPS curve between points $x_1$ and $x_2$, and where $A'_p(x_1, \alpha)$ is a function that returns a point that, together with point $x_1$, delineates the area $\alpha$ under the probability curve.

The mapping function f(LNPS) thus computes the probability value (i.e., point on the probability distribution curve) that corresponds to the point LNPS on the LNPS curve, based on normalizing the area between min_LNPS and LNPS under the LNPS curve (i.e., $A_{LNPS}$(min_LNPS, LNPS)) by multiplying it by the proportion of the areas under the curves:

$$\frac{A_p(min\_p, max\_p)}{A_{LNPS}(min\_LNPS, max\_LNPS)}$$

and finding the corresponding point on the probability curve using the function $A'_p$. The functions $A_p$, $A_{LNPS}$, and $A'_p$ can be readily approximated using the experimentally obtained points constituting the probability and LPNS distribution curves in tabular form and summing the area under each point.

The Podding system combines the mapped LNPS with the probability using weighted averaging to produce the combined score. That is, if the mapped LNPS is high, then the LNPS is given more weight than the probability. Conversely, if the mapped LNPS is low, then the probability is given more weight than the LNPS. The combined score is given by the following formula:

$$\left(\frac{LNPS - min\_LNPS}{max\_LNPS - min\_LNPS}\right) * f(LNPS) + \left(\frac{max\_LNPS - LNPS}{max\_LNPS - min\_LNPS}\right) * p$$

For example, if the mapped LNPS is 0.75 and the probability is 0.5, and max_LNPS is 8, min_LNPS is 0, and LNPS is 6, then the combined score is 0.6875 as follows:

$$\frac{6-0}{8-0} * .75 + \frac{8-6}{8-0} * .5 = .6875$$

Conversely, if the mapped LNPS is 0.25 and the probability is 0.5 and LNPS is 2, then the combined score is 0.4375 as follows:

$$\frac{2-0}{8-0} * .25 + \frac{8-2}{8-0} * .5 = .4375$$

Thus, the combined score is closer to the mapped LNPS when the mapped LNPS is high and closer to the probability when the mapped LNPS is low.

In one embodiment, rather than ordering rules to be applied by their probability, all rules that can be applied are applied, and the resulting nodes, if any, are then ordered for introduction into the chart by the likelihood (as represented by the combined score) that they will participate in generating a successful parse tree. This technique is known as pre-execution (or pre-application) of rules. Pre-execution of rules allows the POD score for a node to be computed before it is needed in the calculation of the combined score by which that node will be ordered for introduction into the chart.

When syntax rules are pre-executed, a new node with a combined score is generated for each pre-executed syntax rule. These nodes, however, are not placed in the chart. Rather, these nodes are placed in a list that is ordered based on the combined scores. The Podding system then selects the node with the highest combined score from the list and adds it to the chart. The Podding system then pre-executes those syntax rules that can be applied to the node just added. The nodes newly created by the pre-execution are also added to the ordered list, and again the Podding system selects the node with the highest combined score to add to the chart. Alternatively, rather than selecting only the node with the highest combined score, the Podding system could select some number of nodes with the highest combined scores and add them to the chart. By pre-executing syntax rules, the Podding system limits the number of nodes in the chart to only those that are most likely to lead to a complete syntax parse tree. By reducing the number of nodes in the chart, the number of syntax rules that can be applied at any given time is greatly reduced and thus performance is increased.

Figure 6:
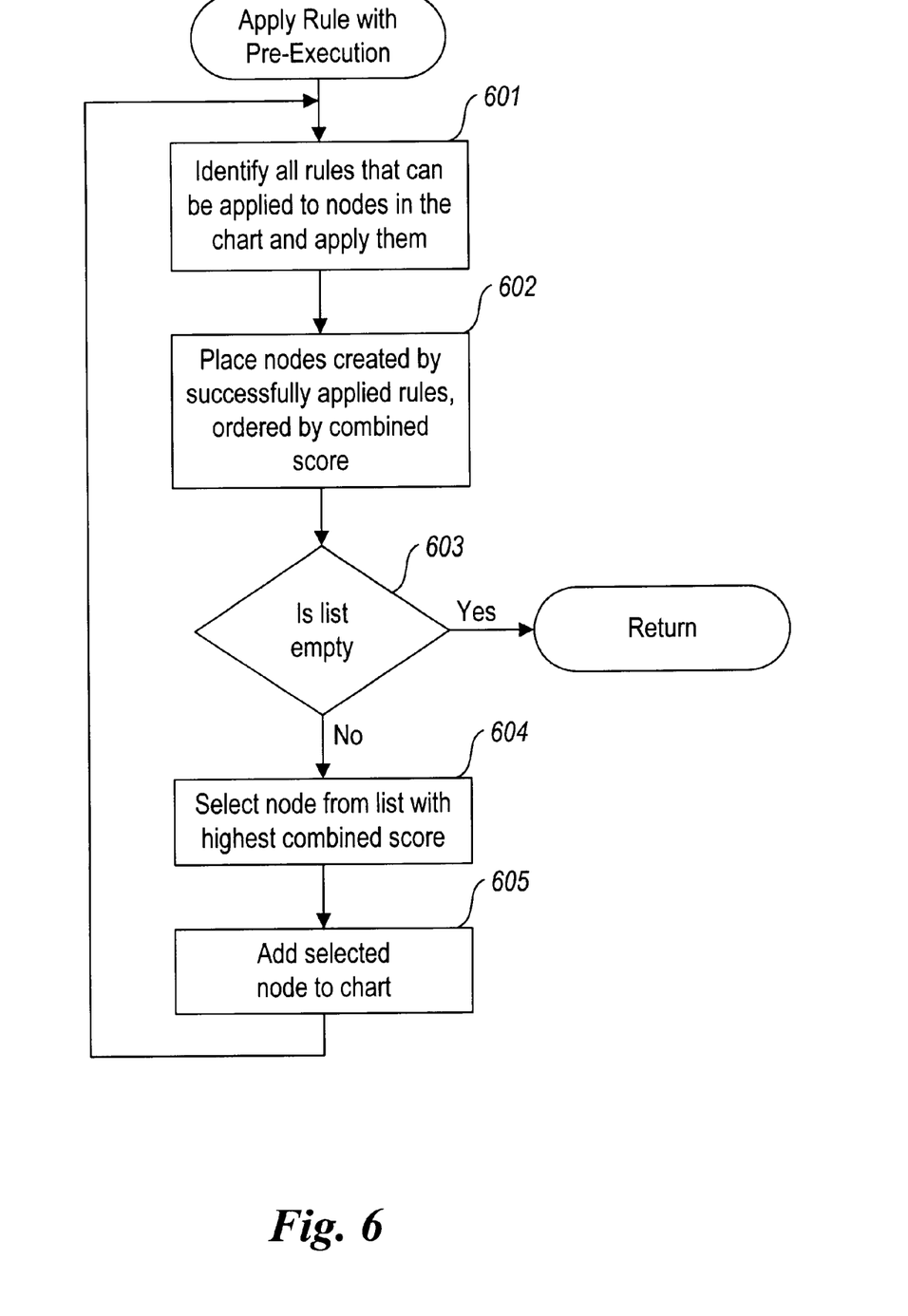
FIG. 6 is a flow diagram of an implementation of a routine for parsing that pre-executes the syntax rules.

FIG. 6 is a flow diagram of an implementation of a routine for parsing that pre-executes the syntax rules. This routine is passed a list of syntax rules and a chart with leaf nodes. In steps 601–605, the routine loops pre-executing the syntax rules, storing the created nodes in an ordered list of nodes, and adding the node from the ordered list with the highest combined score to the chart. In step 601, the routine identifies and applies all the syntax rules that can be applied to the nodes in the chart. In step 602, the routine places nodes created by the successful application of any syntax rules into the ordered list (according to the combined score computed for those nodes), rather than into the chart. In step 603, if the ordered list is empty or if some other termination condition is reached, then the routine is done, else the routine continues in step 604. In step 604, the routine selects the top node from the ordered list. In step 605, the routine adds the selected node to the chart and loops to step 601 to pre-execute additional syntax rules.

In general, parsing continues for some time after the first complete syntax tree is generated. A kind of sliding scale is used to determine how long to continue parsing. Parsing is allowed to continue until it produces an additional number of intermediate-level nodes equal to some percent of the number of intermediate-level nodes produced up to the point where the first complete tree was produced. This additional number will thus be larger for more difficult sentences and smaller for less difficult ones.

In a bottom-up syntax parser, such as the one used in the Podding system, a complete parse tree sometimes cannot be found within the time or memory space allocated for the parse. In that case, a set of spanning sub-trees is selected and combined under a root node representing a fitted parse of the input sentence. It is often the case that there are a great number of possible sets of spanning sub-trees. To efficiently create the fitted parse, the Podding system uses POD scores to select the most likely set of spanning sub-trees.

The Podding system chooses the spanning set of sub-trees based on two criteria. The first criterion is that the selected set comprises the smallest possible number of sub-trees that together span the entire sentence. Generally, the larger the sub-tree, the higher the probability that it represents a correct parse. If there are more than one possible smallest sets of spanning trees, a combined POD score for each possible set is calculated by adding the POD scores of the roots of each sub-tree in each set. The second criterion is that the selected set of the smallest number of spanning sub-trees have the highest combined POD score. In the unlikely case that more than one set of sub-trees meet both criteria, one is chosen arbitrarily for the fitted parse.

Although the present invention has been described in terms of a preferred embodiment, it is not intended that the invention be limited to this embodiment. Modifications within the spirit of the invention will be apparent to those skilled in the art. The scope of the present invention is defined by the claims that follow.

We claim:

1. A method in a computer system for parsing input in a natural language, the computer system having syntax rules indicating how lower-level syntactic constructs in the language are combined to form higher-level syntactic constructs, the method comprising:

providing one or more heuristic score formulas for each syntax rule, the heuristic score formulas for each syntax rule indicating how to calculate a heuristic score when the syntax rule is to be applied to generate a node that may be part of the parse tree, the heuristic score indicating a likelihood that generate node will be part of the parse tree;

initializing a chart to contain one leaf node for each word of the input wherein the chart upon completion of the parse of the input contains a parse tree representing the parse;

applying syntax rules to the nodes of the chart so that higher-level nodes are generated and added to the chart in an order based on a heuristic score calculated in accordance with the heuristic score formulas for the applied syntax rules; and when a termination condition is satisfied, selecting from the chart a set of spanning sub-trees that span each word of the input based on the parse of the input.

2. The method of claim 1 wherein the selected set of spanning sub-trees contains the smallest number of sub-trees.

3. The method of claim 1 wherein the heuristic scores are used to select the set of spanning sub-trees.

4. A method in a computer system for parsing input in a natural language, the computer system having syntax rules indicating how lower-level syntactic constructs in the language are combined to form higher-level syntactic constructs, the method comprising:

providing one or more heuristic score formulas for each syntax rule, the heuristic score formulas for each syntax rule indicating how to calculate a heuristic score when the syntax rule is to be applied to generate a node that may be part of the parse tree, the heuristic score indicating a likelihood that the generated node will be part of the parse tree;

initializing a chart to contain one leaf node for each word of the input wherein the chart upon completion of the parse of the input contains a parse tree representing the parse;

pre-executing all syntax rules by applying them to the nodes of the chart, wherein each higher-level node that is generated is stored in an ordered list, awaiting introduction into the chart in the chart, each generated higher-level node having a heuristic score that is calculated in accordance with the heuristic score formulas for the syntax rule that generated the higher-level node;

adding a higher-level node generated from the pre-execution of syntax rules with the highest heuristic score to the chart; and repeating the pre-executing and adding until the parsing is complete.

5. The method of claim 4 wherein only one higher-level node is added to the chart after each pre-execution of the syntax rules.

6. The method of claim 4 wherein multiple higher-level nodes are added to the chart after each pre-execution of the syntax rules.

7. The method of claim 4 wherein the pre-execution of syntax rules only applies those syntax rules that will apply to a higher-level node added to the chart since the last pre-execution of the syntax rules.

8. The method of claim 4 wherein each syntax rule has a probability and including combining the heuristic score from the application of a syntax rule with the probability of the syntax rule to generate a combined score and wherein the higher-level node added to the chart is the higher-level node with the highest combined score.

9. A method in a computer system for parsing an input sentence in a natural language, the input sentence having words, the computer system having syntax rules indicating how lower-level syntactic constructs in the natural language are combined to form higher-level syntactic constructs, each syntax rule having an associated probability, the parse of the input sentence to be represented by a parse tree with nodes, each node of the parse tree representing a syntactic construct that is part of the parse of the input sentence, the method comprising:

providing one or more heuristic score formulas for each syntax rule, the heuristic score formulas for each syntax rule indicating how to calculate a heuristic score when the syntax rule is to be applied to generate a node that may be part of the parse tree, the heuristic score indicating a likelihood that the generated node will be part of the parse tree;

initializing a chart to contain one leaf node for each word of the input sentence wherein the chart upon completion of the parse of the input sentence contains the parse tree; and repeating the following until the parse tree of the input sentence is generated,
  identifying a syntax rule that can be applied to the nodes of the chart to generate a higher-level node representing the higher-level syntactic construct of the identified syntax rule, the identified syntax rule being determined to be the syntax rule with the greatest likelihood that the resulting generated node will be part of the parse tree, the determination being made by combining a heuristic score calculated in accordance with the provided heuristic score formulas of the syntax rule and the probability of the syntax rule; and
  applying the identified syntax rule to generate the higher-level node and to add the generated higher-level node to the chart.

10. The method of claim 9 including mapping a range of possible heuristic scores to a range of possible probabilities and wherein the combining of the calculated heuristic score and of the probability maps the calculated heuristic score to the range of possible probabilities.

11. The method of claim 10 wherein the heuristic scores are normalized to account for a number of words that would be encompassed by the application of the syntax rule.

12. The method of claim 11 wherein a probability distribution curve and an LNPS curve are generated and wherein the mapping is in accordance with the following:

$$f(LNPS) = A'_p\left(min\_p, A_{LNPS}(min\_LNPS, LNPS) * \frac{A_p(min\_p, max\_p)}{A_{LNPS}(min\_LNPS, max\_LNPS)}\right)$$

where LNPS is a length normalized heuristic score, where $max\_p$ and $min\_p$ are maximum and minimum probabilities, where $max\_LNPS$ and $min\_LNPS$ are maximum and minimum length normalized heuristic scores, where $A_p(x_1, x_2)$ is a function that returns the area under the probability curve between points $x_1$ and $x_2$, where $A_{LNPS}(x_1, x_2)$ is a function that returns the area under the LNPS curve between points $x_1$ and $x_2$, and where $A'_p(x_1, \alpha)$ is a function that returns a point that, together with point $x_1$, delineates the area $\alpha$ under the probability curve.

13. The method of claim 9 wherein the calculated heuristic score and the probability are combined using weighted averaging so that when the heuristic score is high it is given a high weight and when the heuristic score is low it is given a low weight.

14. The method of claim 9 wherein the calculated heuristic score and the probability are combined in accordance with the following:

$$\left(\frac{LNPS - min\_LNPS}{max\_LNPS - min\_LNPS}\right) * f(LNPS) + \left(\frac{max\_LNPS - LNPS}{max\_LNPS - min\_LNPS}\right) * p$$

where f(LNPS) is the calculated heuristic score that is normalized based on number of words and that is mapped to the range of probabilities, where p is the probability, where $max\_p$ and $min\_p$ are maximum and minimum probabilities, and where $max\_LNPS$ and $min\_LNPS$ are maximum and minimum length normalized heuristic scores.

15. The method of claim 9 wherein the heuristic score formulas indicate how to calculate a numerical value to be assigned to the successful application of a syntax rule.

16. The method of claim 15 wherein the heuristic score rules indicate to combine scores of the lower-level syntactic constructs to which the syntax rule is to be applied.

17. The method of claim 9 wherein the identifying of a syntax rule includes pre-executing each syntax rule that could be applied to the current chart to generate a higher-level node which is not added to the chart and that has not yet been pre-executed and selecting as the identified syntax rule that pre-executed syntax rule with the highest combined score.

18. The method of claim 9 including before identifying a syntax rule, determining the combined score of each syntax rule that can be applied to the chart to generate a node and saving the determined combined scores to avoid re-determining the determined combined scores as higher-level nodes are added to the chart.

19. The method of claim 18 wherein the identifying of a syntax rule selects the syntax rule when the highest determined combined score.

20. The method of claim 9 wherein when a pre-determined termination condition is satisfied, generating the parse tree by selecting set of spanning sub-trees and combining the set of spanning sub-tree under a root node for the parse tree.

21. The method of claim 20 wherein the set of spanning sub-trees is selected based on the combine score for the root nodes of the sub-trees.

22. The method of claim 20 wherein the selected set of spanning sub-trees is the set with the minimum number of sub-trees.

23. The method of claim 22 wherein when two sets of spanning sub-trees have the same minimum number of sub-trees, then the set with the highest total combined score is selected.

24. The method of claim 1 wherein the identifying and applying continue after a first parse tree is completed until a number of additional nodes are generated, the number being derived from the number of nodes that were created when generating the first parse tree.

25. A method in a computer system for determining a likelihood that a certain syntax rule when applied to a partial parse of an input will be part of the correct complete parse for the input, the computer system having syntax rules indicating a higher-level syntactic construct to be created from one or more lower-level syntactic constructs, each syntax rule having a probability, each syntax rule having a heuristic score formula indicating how to calculate a heuristically derived score for the higher-level syntactic construct when the syntax rule is applied, the method comprising:
  for each syntax rule applied when parsing the input,
    calculating a heuristic score for the higher-level syntactic construct of the syntax rule based on the heuristic score formula of the syntax rule; and
    combining the probabilities and the calculated heuristic score to generate a combined score indicating the likelihood that the syntax rule when applied to the current partial parse of the input will be part of the correct parse for the input.

26. The method of claim 25 including mapping a range of possible heuristic scores to a range of possible probabilities and wherein the combining of the calculated heuristic score and of the probability maps the calculated heuristic score to the range of possible probabilities.

27. The method of claim 26 wherein the heuristic scores are normalized to account for a number of words that would be encompassed by the application of the syntax rule.

28. The method of claim 27 wherein a probability distribution curve and an LNPS curve are generated and wherein the mapping is in accordance with the following:

$$f(LNPS) = A'_p\left(min\_p, A_{LNPS}(min\_LNPS, LNPS) * \frac{A_p(min\_p, max\_p)}{A_{LNPS}(min\_LNPS, max\_LNPS)}\right)$$

where LNPS is a length normalized heuristic score, where max_p and min_p are maximum and minimum probabilities, where max_LNPS and min_LNPS are maximum and minimum length normalized heuristic scores, where $A_p(x_1, x_2)$ is a function that returns the area under the probability curve between points $x_1$ and $x_2$, where $A_{LNPS}(x_1, x_2)$ is a function that returns the area under the LNPS curve between points $x_1$ and $x_2$, and where $A'_p(x_1, \alpha)$ is a function that returns a point that, together with point $x_1$, delineates the area $\alpha$ under the probability curve.

29. The method of claim 25 wherein the calculated heuristic score and the probability are combined using a weighted averaging so that when the heuristic score is high it is given a high weight and when the heuristic score is low it is given a low weight.

30. The method of claim 25 wherein the calculated heuristic score and the probability are combined in accordance with the following:

$$\left(\frac{LNPS - min\_LNPS}{max\_LNPS - min\_LNPS}\right) * f(LNPS) + \left(\frac{max\_LNPS - LNPS}{max\_LNPS - min\_LNPS}\right) * p$$

where f(LNPS) is the calculated heuristic score that is normalized based on number of words and that is mapped to the range of probabilities, where p is the calculated probability, where max_p and min_p are maximum and minimum probabilities, and where max_LNPS and min_LNPS are maximum and minimum length normalized heuristic scores.

31. The method of claim 25 wherein the heuristic score rules indicate how to calculate a numerical value to be assigned to the application of a syntax rule.

32. The method of claim 25 wherein the syntax rules are applied in an ordering so that the syntax rules resulting in the highest combined scores are applied first.

33. The method of claim 25 including pre-executing each syntax rule that could be applied to the partial parse to generate a higher-level syntactic construct which is not reflected in the partial parse and that has not yet been pre-executed and selecting that pre-executed syntax rule with the highest combined score to apply to the partial parse.

34. The method of claim 25 including determining the combined score of each syntax rule that can be successfully applied to the partial parse and saving the determined combined scores to avoid re-determining the determined combined scores as higher-level syntactic constructs are processed.

35. The method of claim 34 wherein the syntax rule with the highest determined combined score is applied to the partial parse.

36. A computer-readable medium containing instructions for causing a computer system to determine a likelihood that a certain syntax rule when applied to a partial parse of an input will be part of the correct parse for the input, the computer system having syntax rules indicating a higher-level syntactic construct to be created from one or more lower-level syntactic constructs, each syntax rule having a probability, each syntax rule having a heuristic score formula indicating how to calculate a heuristically derived score for the higher-level syntactic construct when the syntax rule is applied, by:

for each syntax rule applied when parsing the input,
calculating a heuristic score for the higher-level syntactic construct of the syntax rule based on the heuristic score formula of the syntax rule; and
combining the probabilities and the calculated heuristic score to generate a combined score indicating the likelihood that the syntax rule when applied to the current partial parse of the input will be part of the correct parse for the input.

37. The computer-readable medium of claim 36 including mapping a range of possible heuristic scores to a range of possible probabilities and wherein the combining of the calculated heuristic score and of the probability maps the calculated heuristic score to the range of possible probabilities.

38. The computer-readable medium of claim 37 wherein the heuristic scores are normalized to account for a number of words that would be encompassed by the application of the syntax rule.

39. The computer-readable medium of claim 38 wherein a probability distribution curve and an LNPS curve are generated and wherein the mapping is in accordance with the following:

$$f(LNPS) = A'_p\left(min\_p, A_{LNPS}(min\_LNPS, LNPS) * \frac{A_p(min\_p, max\_p)}{A_{LNPS}(min\_LNPS, max\_LNPS)}\right)$$

where LNPS is a length normalized heuristic score, where max_p and min_p are maximum and minimum probabilities, where max_LNPS and min_LNPS are maximum and minimum length normalized heuristic scores, where $A_p(x_1, x_2)$ is a function that returns the area under the probability curve between points $x_1$ and $x_2$, where $A_{LNPS}(x_1, x_2)$ is a function that returns the area under the LNPS curve between points $x_1$ and $x_2$, and where $A'_p(x_1, \alpha)$ is a function that returns a point that, together with point $x_1$, delineates the area $\alpha$ under the probability curve.

40. The computer-readable medium of claim 36 wherein the calculated heuristic score and the probability are combined using a weighted averaging so that when the heuristic score is high it is given a high weight and when the heuristic score is low it is given a low weight.

41. The computer-readable medium of claim 36 wherein the calculated heuristic score and the probability are combined in accordance with the following:

$$\left(\frac{LNPS - min\_LNPS}{max\_LNPS - min\_LNPS}\right) * f(LNPS) + \left(\frac{max\_LNPS - LNPS}{max\_LNPS - min\_LNPS}\right) * p$$

where f(LNPS) is the calculated heuristic score that is normalized based on number of words and that is mapped to the range of probabilities, where p is the calculated probability, where max_p and min_p are maximum and minimum probabilities, and where max_LNPS and min_LNPS are maximum and minimum length normalized heuristic scores.

42. The computer-readable medium of claim 36 wherein the heuristic score formulas indicate how to calculate a numerical value to be assigned to the application of a syntax rule.

43. The computer-readable medium of claim 36 wherein the syntax rules are applied in an ordering so that the syntax rules resulting in the highest combined scores are applied first.

44. The computer-readable medium of claim 36 including pre-executing each syntax rule that could be applied to the partial parse to generate a higher-level syntactic instruct which is not reflected in the partial parse and that has not yet been pre-executed and selecting that pre-executed syntax rule with the highest combined score to apply to the partial parse.

45. The computer-readable medium of claim 36 including determining the combined score of each syntax rule that can be successfully applied to the partial parse and saving the determined combined scores to avoid re-determining the determined combined scores as higher-level syntactic constructs are processed.

46. The computer-readable medium of claim 45 wherein the syntax rule with the highest determined combined score is applied to the partial parse.

* * * * *